(12) United States Patent
Solomon (10) Patent No.: US 7,048,422 B1
(45) Date of Patent: May 23, 2006

(54) LIGHT EMITTING SIGNALING APPARATUS

(76) Inventor: Stephen Solomon, 293 Main St., P.O. Box 297, Owego, NY (US) 13827

( * ) Notice: Subject to any disclaimer, the term of this patent is extended or adjusted under 35 U.S.C. 154(b) by 157 days.

(21) Appl. No.: 10/801,243

(22) Filed: Mar. 16, 2004

(51) Int. Cl.
*B60Q 1/26* (2006.01)

(52) U.S. Cl. ............................ 362/503; 362/84; 345/76

(58) Field of Classification Search ................ 362/84, 362/503, 504; 313/503, 510, 117; 345/76
See application file for complete search history.

(56) References Cited

U.S. PATENT DOCUMENTS

| | | | | |
|---|---|---|---|---|
| 3,004,359 | A * | 10/1961 | Pisciotta | 40/591 |
| 4,258,492 | A * | 3/1981 | Williams | 40/591 |
| 4,568,928 | A * | 2/1986 | Biferno | 345/76 |
| 4,574,269 | A | 3/1986 | Miller | 362/503 |
| 4,645,970 | A * | 2/1987 | Murphy | 313/509 |
| 5,336,965 | A * | 8/1994 | Meyer et al. | 313/509 |
| 5,764,141 | A | 6/1998 | Chan | 340/472 |
| 6,270,236 | B1 | 8/2001 | Brussog | 362/249 |
| 2003/0165343 | A1 | 9/2003 | Spanke | 398/140 |
| 2005/0157513 | A1 * | 7/2005 | Alexander et al. | 362/503 |

* cited by examiner

*Primary Examiner*—Sandra O'Shea
*Assistant Examiner*—Ismael Negron
(74) *Attorney, Agent, or Firm*—Mark Levy & Associates, PLLC; David L. Banner (57) ABSTRACT

A signaling apparatus including a substantially transparent panel, a light emitting element attached to a surface of the transparent panel, substantially transparent means for delivering power to the light emitting elements, and means for selectively controlling energization of the light emitting elements. The signaling apparatus being substantially transparent when the light emitting elements are not in an energized state. The light emitting elements might be LEDS, organic LEDS (OLEDs), electroluminescent displays, LCDs, or incandescent bulbs. The signaling apparatus is adapted to be mounted on a vehicle window for providing selectable patterns, variable rate flashing, changeable colors, textual or graphic messages, strobe lights, and other types of displays. Cooling channels or a cooling plenum may be provided to allow higher power (e.g., high intensity) operation.

21 Claims, 6 Drawing Sheets

LIGHT EMITTING SIGNALING APPARATUS

FIELD OF THE INVENTION

The invention pertains to emergency warning lights and, more particularly, to a system of transparent warning lights and/or a signaling or communicating device suitable for mounting in a window of an emergency vehicle without significantly occluding the otherwise transparent apparatus.

BACKGROUND OF THE INVENTION

Emergency vehicles such as police cars, fire response vehicles, ambulances, and the like require highly visible warning lights and signals to alert motorists of their presence. Warning lights visible to motorists from a reasonable distance allow drivers to safely make way for an overtaking emergency vehicle. Many emergency vehicles have large glass windshields and/or rear windows. These surfaces offer ideal locations for emergency signals. Unfortunately, these advantageous surfaces have heretofore not been unutilized for such purposes because any warning signal device placed therein has significantly limited visibility of the driver of the emergency vehicle. It would be advantageous, therefore, to have an emergency signaling system which could take advantage of highly visible placement positions such as a rear window or windshield of an emergency vehicle without significantly affecting the vehicle driver's visibility.

DISCUSSION OF THE RELATED ART

U.S. Pat. No. 4,574,269 for VEHICLE COMMUNICATOR, issued Mar. 4, 1986 to Gregory R. Miller, discloses a semi-transparent unit for selectively displaying a message adapted for mounting in the rear window of a vehicle. Mounting is by a frame adjustable to conform to the periphery of the vehicle's window to which the MILLER apparatus is attached. Ancillary brake and/or turn signals are optionally included on the rear window mounted apparatus. A remote programmer is used to select from among a plurality of predetermined messages.

U.S. Pat. No. 5,764,141 for MOTOR VEHICLE WARNING SIGNAL LIGHT ASSEMBLY, issued Jun. 9, 1998 to Jih-Cheng Chan, teaches an auxiliary stop light, emergency signal, and optional turn signal indicators for use in the rear window of a motor vehicle.

U.S. Pat. No. 6,270,236 for LED LIGHTING UNIT WITH TRANSPARENT CARRIER PANEL, issued Aug. 7, 2001 to Ingo Brussog, teaches a transparent carrier panel upon which are mounted surface mount LEDs electrically connected via indium-tin oxide (ITO) interconnections.

United States Pregrant Publication 2003/00165343 for STOP LAMP FOR VEHICLES, published upon application of Kiyohiro Akiyama teaches an LED array on a transparent substrate designed for direct mounting on the rear window of a vehicle using double back tape.

In contradistinction, the signaling apparatus of the present invention utilizes a readily removable, substantially transparent, universal signal and message display system primarily for use in rear windows or on windshields of emergency vehicles. Multiple color indicators, varying patterns and flash rates are provided. In addition, the normally transparent substrate supporting the light-emitting elements may selectively be made opaque to provide a contrasting background to the display as well as privacy as desired.

In addition, one embodiment of the invention utilizes a second substrate parallel to the first, thereby forming a plenum for circulating cooling air to allow high-powered (e.g., high intensity) operation of the signaling apparatus as is suitable for use in emergency vehicles. In still other embodiments of the invention, the display may be hinged so as to fold away from a window when not in use. This movement may be either manually or automatically performed.

None of these patents, either individually or in combination, is seen to teach or suggest the novel features of the emergency vehicle signaling apparatus of the present invention.

SUMMARY OF THE INVENTION

In accordance with the present invention there is provided a signaling apparatus adapted for mounting on a transparent substrate in or on a windshield, rear window, or other window of an emergency vehicle. The signaling apparatus uses an array of light-generating elements such as LEDs, organic LEDs (OLEDs), electroluminescent displays, LCD displays, or incandescent bulbs to create displays having selectable patterns, variable rate flashing, changeable colors, textual or graphic messages, strobe lights, and virtually any other imaginable type of display. The signaling apparatus may be permanently affixed to the window or, alternatively, may be removably attached. In still other embodiments, the signaling apparatus may be hinged and either manually or automatically moved into place for use. Cooling channels or a cooling plenum may be provided to allow high power (e.g., high intensity) operation. Optionally, the signaling apparatus may selectively be made opaque using existing electrochromic processes to provide a contrasting background to the display as well as privacy within the vehicle, at least through the window upon which the signaling apparatus is mounted.

It is therefore an object of the invention to provide a versatile signaling apparatus for use in emergency vehicles.

It is another object of the invention to provide a signaling apparatus selectively providing a wide range of warning lights, symbol, or textual message display.

It is a further object of the invention to provide a signaling apparatus which is substantially transparent at least when inactive, thereby allowing unobstructed vision through the apparatus.

It is a still further object of the invention to provide a signaling apparatus capable of displaying multiple colors.

It is yet another object of the invention to provide a signaling apparatus which may be permanently installed, removably installed, or hingedly installed in an emergency vehicle's window.

It is an additional object of the invention to provide a signaling apparatus through which cooling air may be circulated to allow high power operation of the signaling apparatus.

It is a further object of the invention to provide a signaling apparatus that may selectively be made opaque upon application of a suitable electrical signal.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention provides a substantially transparent emergency vehicle signaling apparatus (EVSA) for use in an emergency vehicle such as a police car, ambulance, fire truck, rescue vehicle, or the like. When not in use (i.e., not turned on), the EVSA allows unobstructed vision through the unit and may, therefore, be permanently affixed in or to a windshield or rear window of a vehicle without creating a safety hazard.

Figure 1:
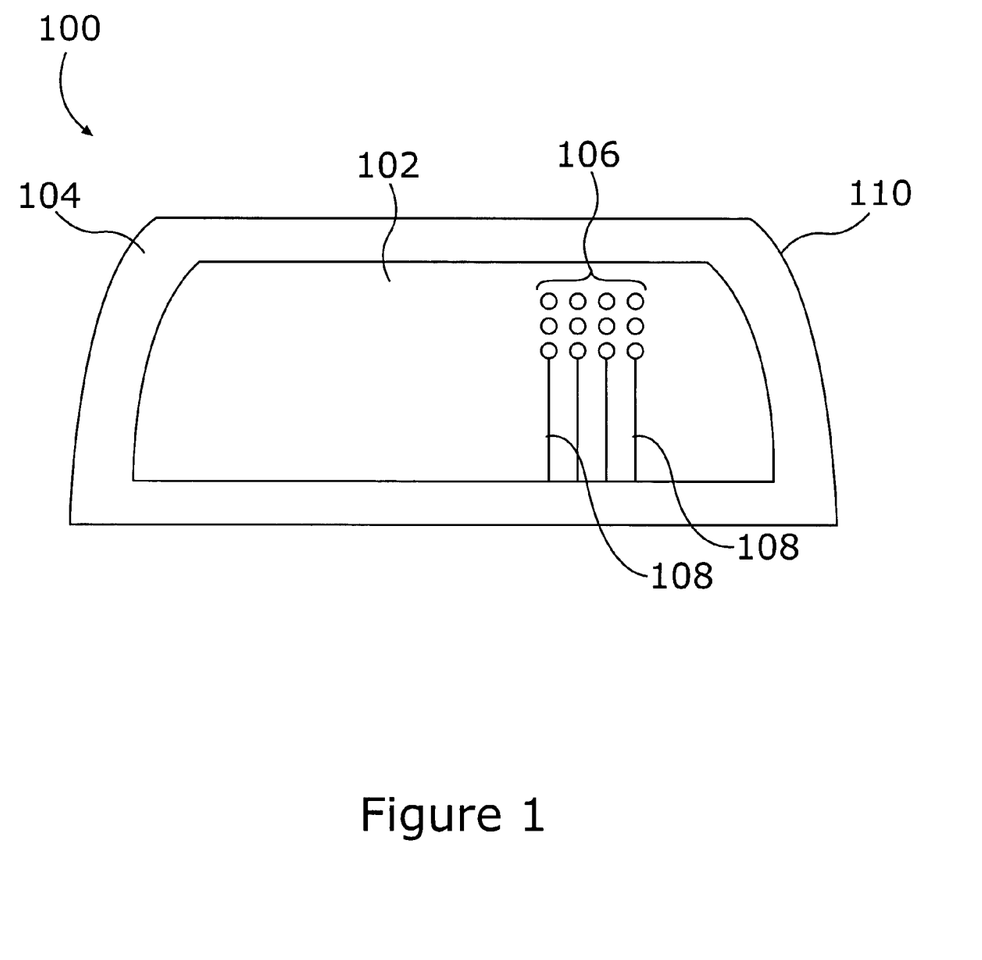
FIG. 1 is a schematic plan view of an embodiment of the signaling apparatus of the invention.

Referring first to FIG. 1, there is shown a schematic plan view of an EVSA 102 in accordance with the invention, shown mounted in a vehicle window 104. A plurality of light-emitting elements 106, shown schematically as circles, are disposed in a central region of EVSA 102. It will be recognized that, depending upon the usage of EVSA 102, the pattern of light-emitting elements 106 may vary. In some applications, light-emitting elements 106 may be disposed substantially in peripheral regions of EVSA 102. In other applications, the EVSA 102 may be capable of multi-line, full text messages, a fairly dense, uniform array of light-emitting elements 106 will be required. For applications wherein EVSA 102 will be required to display only a limited number of predetermined symbols, the array of light-emitting elements 106 may be smaller, sparse or both smaller and sparse. Consequently, the EVSA 102 of the present invention is not considered limited to any particular arrangement of light-emitting elements 106 upon its face, but rather is seen to encompass all possible arrangements of light-emitting elements 106.

It will also be recognized that a wide variety of different known devices may be used to implement light-emitting elements 106. These include, but are not limited to LEDs, organic LEDs (OLEDs), electroluminescent devices, and incandescent lamps, either directly disposed on the surface of EVSA 102 or located remotely therefrom and connected to the surface by optical fibers or the like. It will be recognized that multiple types of light-emitting elements may be used to provide a wider range of display possibilities. Multi-color LEDs, for example, may be used as light-emitting elements 106 so that, by proper application of voltage, or through other control means, EVSA 102 may selectively display different colors. Alternatively, light-emitting elements 106 may be formed from groups of LEDs or other light-emitting devices each having different primary colors, analogous to sub-pixels in LED-based flat-panel displays. Using such a technique, EVSA 102 could be made to display full color images in a manner similar to a multi-color scoreboard.

EVSA 102, as depicted in FIG. 1, has a border between the edges thereof and a frame region 110 of window 104. While EVSA 102 may be sized and positioned as shown, more likely EVSA 102 will extend substantially completely to the edge (i.e., to a point adjacent the frame region 110) of window 104. For permanent attachment, a double back tape, not shown, or similar adhesive system may be used to secure EVSA 102 to window 104. Other fastening methods, not shown, such as brackets mounting the EVSA 102 to a rear deck of a vehicle, bracket mounting EVSA 102 to the ceiling of a vehicle, etc., none of which are shown, may also be used and will be described in more detail hereinbelow.

Electrical connections 108 connect either individual ones or groups of light-emitting elements 106 to external circuitry, not shown, from one or more edges of EVSA 102. Electrical connection 108 may be implemented using fine, discrete wires, not shown, or by using conductive lines, not shown, formed from a conductive, transparent material such as indium-tin oxide (ITO) as is well known to designers of flat panel displays and other similar devices. The ITO conductor approach is preferable because the conductors may be screen printed or otherwise disposed on the substrate, not shown, of EVSA 102. Fine wires would require much more sophisticated assembly techniques and, depending upon the required current, may be so large in diameter as to significantly reduce the overall transparency of EVSA 102.

As described in detail hereinbelow, electrical connections 108 may be made to either individual ones or groups of light-emitting elements 106 as is required for a specific implementation of EVSA 102. Matrix addressing techniques, wherein individual rows and columns of light-emitting elements are commonly connected to row and column driver lines, may be used. When such matrix addressing techniques are used, a particular light-emitting element 106 is energized by applying a voltage or other signal to both the associated row and associated column driver line for that particular light-emitting element. Such a row and column drive technique is commonly used to address individual pixels and sub-pixels in flat-panel displays.

Figure 2A:
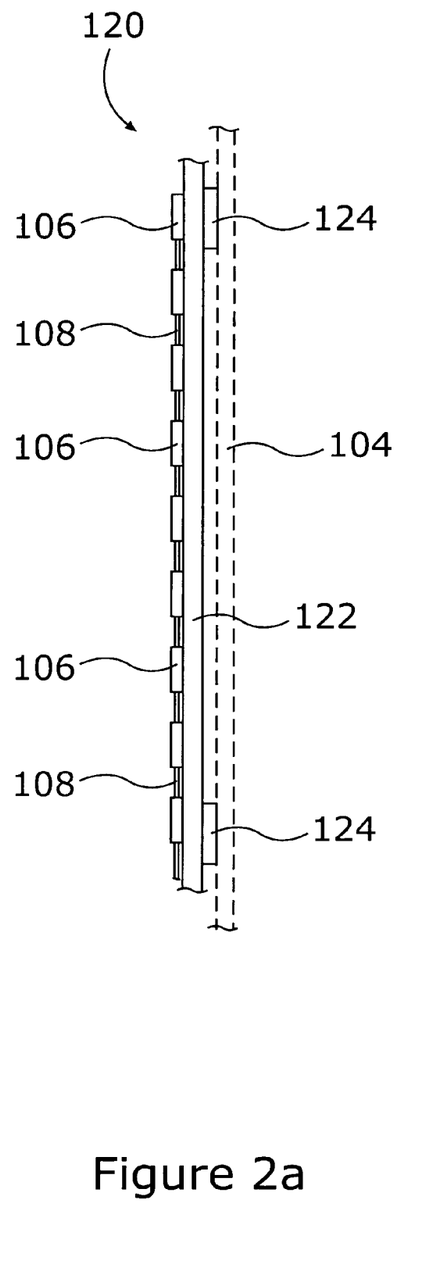
FIG. 2*a* is a schematic, cross-sectional view of a portion of the signaling apparatus of FIG. 1.

Referring now to FIG. 2a, there is shown a schematic, edge, cross-sectional view of a portion of the EVSA 102 of FIG. 1, generally at reference number 120. As may be seen, EVSA 102 comprises a single, substantially transparent substrate 122 upon which are disposed light-emitting elements 106 and electrical connections 108. Vehicle window 104 is shown in phantom to indicate the relationship of EVSA 102 thereto. Mounting devices 124 are shown disposed between a front surface of EVSA 102 and vehicle window 104. Mounting devices 124 may be a double back adhesive device well known to those of skill in the art.

Figure 2B:
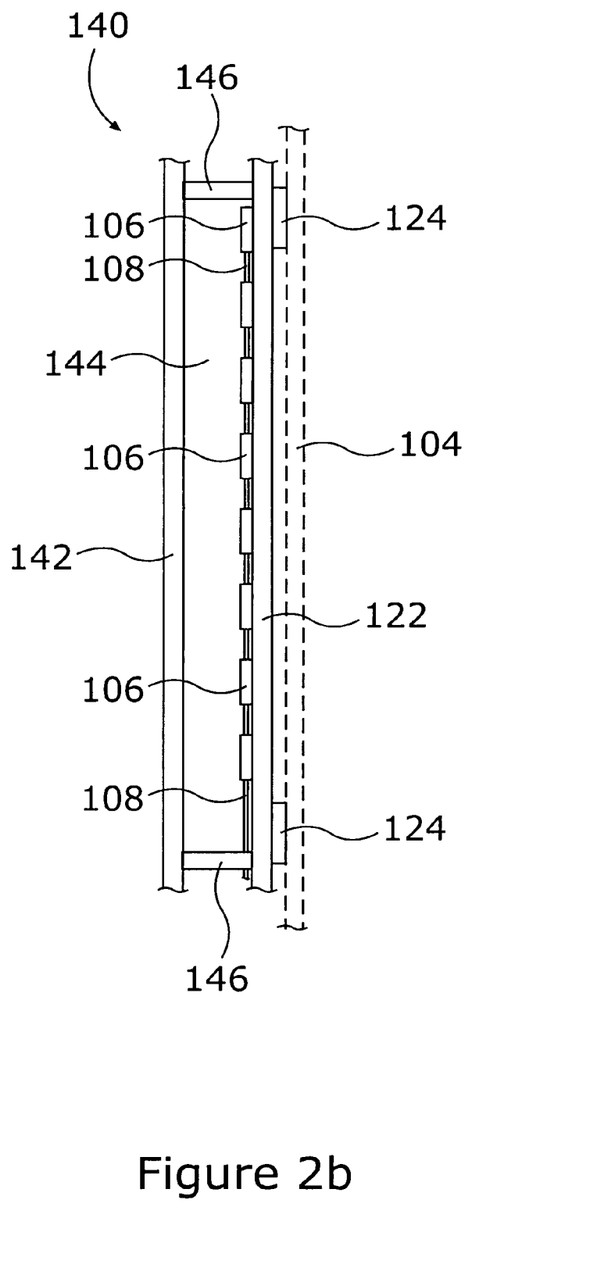
FIG. 2b is a schematic, cross-sectional view of a portion of an alternate embodiment of a signaling apparatus of the invention.

Referring now also to FIG. 2b, there is shown a schematic, edge, cross-sectional view of an alternate embodiment of the EVSA 102 of FIG. 1, generally at reference number 140. In addition to substrate 122, a second, substantially transparent substrate 142 is disposed in a spaced-apart relationship to first substrate 122. Spacers 146 are used to maintain a predetermined spaced apart relationship, and/or secure substrates 122, 142 to one another. The space 144 between substrates 122, 142 forms a plenum through which cooling air, not shown, may be circulated. By applying cooling air directly to light-emitting elements 106, the light-emitting elements 106 may be operated reliably at a higher intensity than were they not cooled. Air may be supplied by a fan or blower 160 (FIG. 3) at ambient temperature. For more extreme operation (i.e., higher intensity), chilled air may also be supplied. Either compressor-based, traditional refrigeration, or electrical cooling using Peltier devices, not shown, or the like may be used.

Figure 2C:
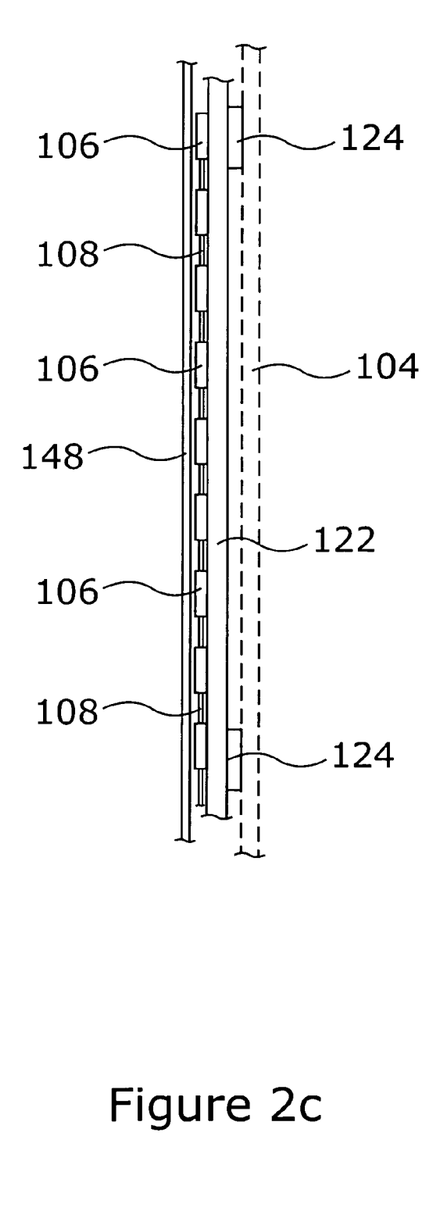
FIG. 2c is a schematic, cross-sectional view of the signaling apparatus of FIG. 2a having an added electrochromic layer.
Figure 2D:
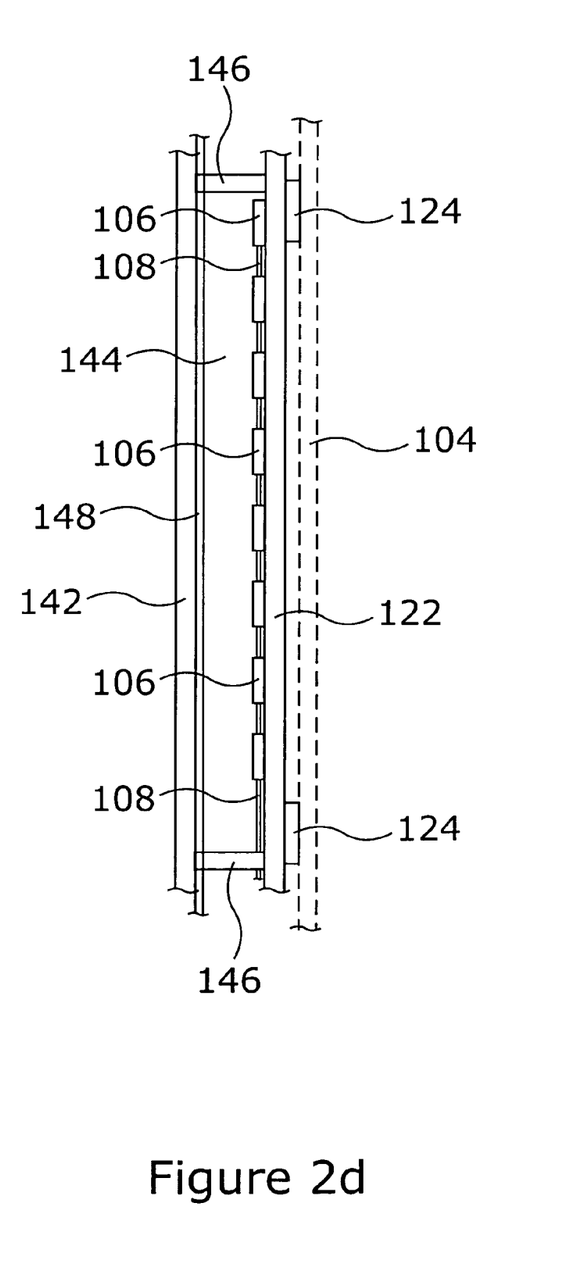
FIG. 2d is a schematic, cross-sectional view of the alternate embodiment of a signaling apparatus of FIG. 2b with an added electrochromic layer.

Referring now also to FIGS. 2c and 2d, there are shown schematic, cross-sectional diagrams of the embodiments of EVSA 102 of FIGS. 2a and 2b, respectively, but an eletrochromic layer 148 has been added. Electrochromic layer 148 is disposed behind light-emitting elements 106 in the embodiment of FIG. 2c. In an alternate arrangement, not shown, electrochromic film 148 may be disposed on a rear surface of substrate 122 and light-emitting elements 106 may penetrate elctrochromic film 148. Electrochromic layer 148 is disposed on substrate 142 in the embodiment of FIG. 2d. Electrochromic devices such as optically switchable glass (i.e., "smart" windows) are well known and will not be described further hereinbelow. Application of a voltage or other signal to an electrochromic layer 148 causes that layer 148 to change from a transparent state to an opaque state. Some electrochromic devices may be controlled to provide a substantially continuous range of light blocking between transparent and opaque.

Figure 3:
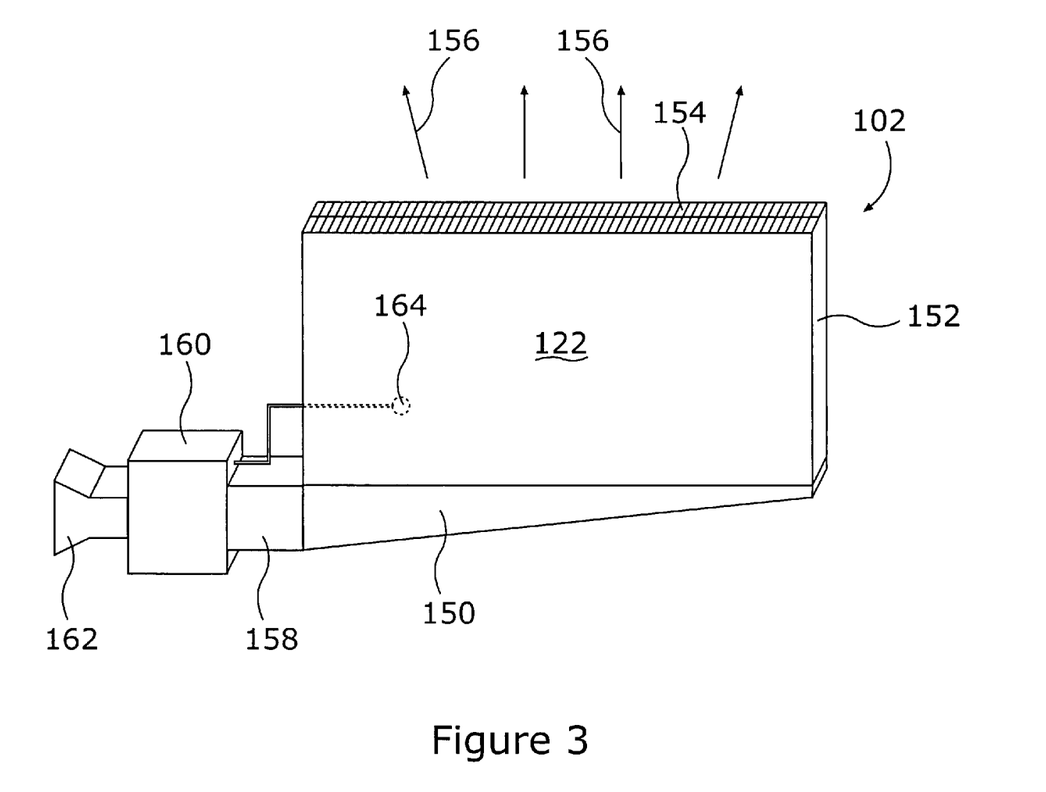
FIG. 3 is a diagrammatic, schematic view of a cooling system suitable for use with the signaling apparatus of FIGS. 2b and 2d.

Referring now to FIG. 3, there is shown a diagrammatic representation of one method for accomplishing cooling of EVSA 102. In the embodiments of FIGS. 2b and 2d, space or plenum 144 allows cooling air to contact light-emitting elements 106. Cooling air may be supplied to a bottom edge of EVSA 102 by a plenum 150 attached thereto. Assuming that the vertical edges of EVSA 102 are sealed with a panel 152, air forced into plenum 150 from supply duct 158 flows across the light-emitting elements 106 and exits the top of EVSA 102 through a grill 154 in the direction indicated by arrows 156. In alternate embodiments, air may be supplied to one edge of EVSA 102 and exit through an opposite edge. It will be recognized by those skilled in the art that many other implementations may be provided to cool light-emitting elements 106. The invention in not considered limited to the embodiment chosen for purposes of disclosure.

A supply duct 158 may be connected to a fan or blower 160 which is, in turn, supplied air by intake 162. Fan or blower 160 may be controlled by a temperature sensor 164 located on or in EVSA 102. Either an on/off control or a continuous control of air flow may be provided by temperature sensor 164 in cooperation with appropriate control circuitry, not shown, operatively connected to fan or blower 160 and temperature sensor 164.

In alternate embodiments, cooled air may be supplied to supply duct 158 from the vehicle's cooling and ventilating system by means of a suitable adapter. In yet other embodiments, air intake 162 may be located outside the vehicle. In still other embodiments, air discharged from grill 154 may be conveyed outside the vehicle by another plenum, not shown, and suitable ducts.

Figure 4A:
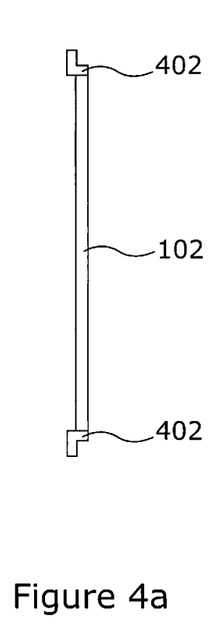
FIG. 4a is a side, elevational view showing a first embodiment of a mounting arrangement of the signaling apparatus of FIG. 1.
Figure 4B:
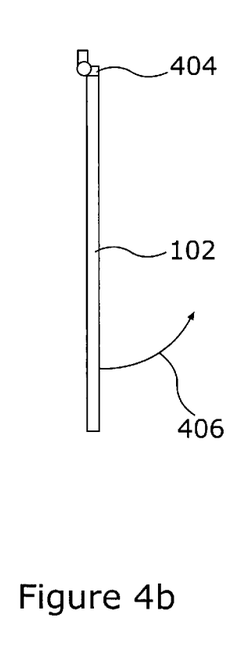
FIG. 4b is a side, elevational showing a second embodiment of a mounting arrangement of the signaling apparatus of FIG. 1.
Figure 4C:
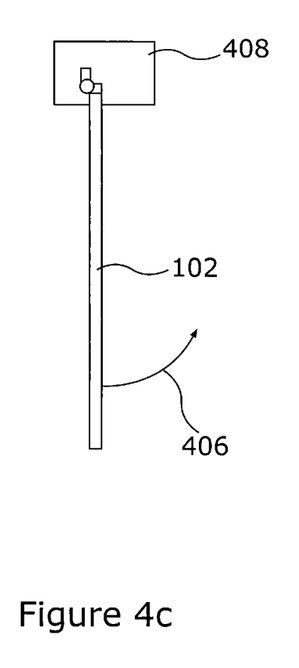
FIG. 4c is a side, elevational showing a third embodiment of a mounting arrangement of the signaling apparatus of FIG. 1.

Referring now to FIGS. 4a, 4b, and 4c, there are shown schematic representations of the embodiments for mounting EVSA 102 to a vehicle. In FIG. 4a, one or more fixed brackets 402, rigidly secures to EVSA 102, are used to secure EVSA 102 to the vehicle using fasteners, not shown.

In FIG. 4b, top bracket 402 is replaced by a hinge 404. The use of hinge 404 allows EVSA 102 to be manually moved along a path defined by arrow 406 for storage when not in use. It will be recognized that, alternatively, hinge 404 could be placed on a lower edge of EVSA 102 thus allowing EVSA 102 to fold downwardly as well as upwardly.

In FIG. 4c, hinge 404 (FIG. 4b) is replaced by an electro-mechanical actuator 408 which, in response to a signal, not shown, automatically folds EVSA 102 upwardly. Electro-mechanical actuator 408 is shown schematically. It will be recognized that a wide variety of electrical, pneumatic, or hydraulic devices may be used to accomplish the intended function of electro-mechanical actuator 408. Consequently, the invention in not considered limited to any particular electro-mechanical actuator but is seen to encompass any mechanism capable of moving EVSA 102.

Figure 5:
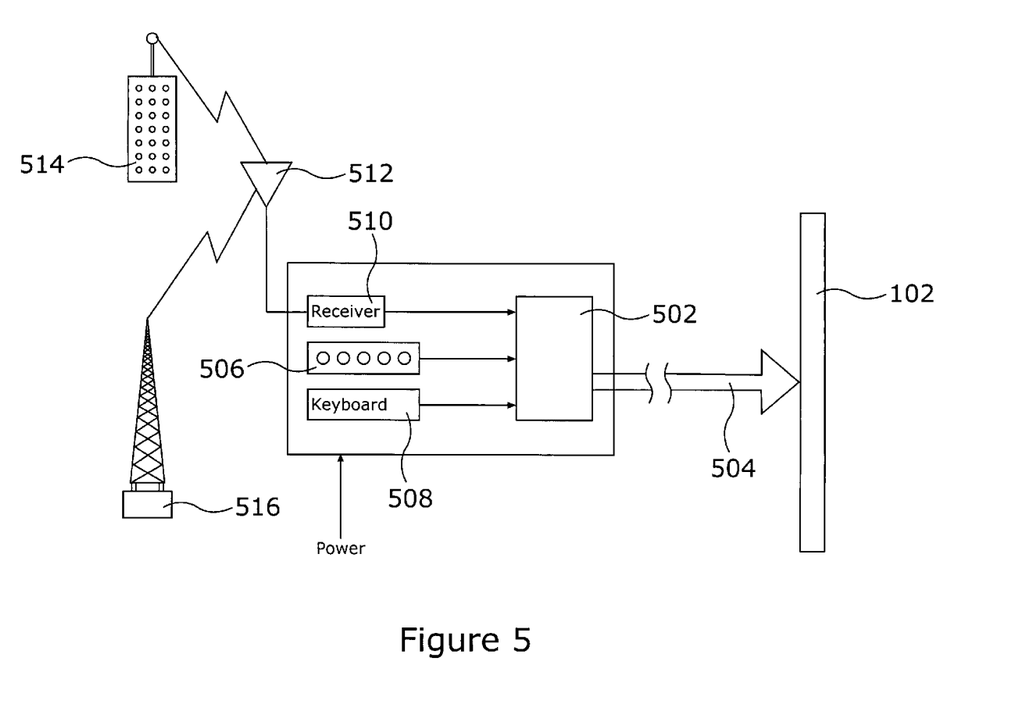
FIG. 5 is a schematic block diagram of a controller suitable for use with the signaling apparatus of the invention.

Referring now to FIG. 5, there is shown a controller 500 which controls all aspects of the display provided on EVSA 102. A light-emitting device controller 502 is connected to EVSA 102 by a cable 504. Connectors, not shown, may be provided at controller 500 and/or EVSA 102. A keyboard 508 for providing textual input is connected to light-emitting device controller 502. A selector panel 506 is likewise connected to light-emitting device controller 502. In addition, a radio receiver 510 is connected to light-emitting device controller 502. Receiver 510 is adapted to optionally receive control input from two possible sources. First, a local remote control 514 designed for short range communication with controller 500 is provided. Alternatively, control may be provided from a remote location 516, such control being broadcast from transmission tower 518, for example.

Light-emitting device controller 502, upon input from keyboard 508, selector panel 506, or remotely generated input from receiver 510, translates input commands into actuation signals for the plurality of light-emitting devices 106 (FIG. 1). Text, symbols (either stationary or animated), flashing lights, changing colors, strobe, scrolling speed, flash rate and/or duration are a few of the parameters of EVSA 102 that are controlled by controller 500. Control of electrochromic device 148 (FIGS. 2c, 2d) may also be exercised by controller 500. It will be recognized that controller 500 is disclosed as a generic device and is enabled to provide any and all control necessary to control the display from EVSA 102. Exact circuitry for implementing any of the possible features is well known to those skilled in the art and is not described further herein.

Since other modifications are changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. A see-through signaling apparatus, comprising:
  a) a single substantially transparent panel having a front and a rear surface substantially parallel to one another, said front surface of said single transparent panel being adapted for mounting to a vehicle window;
  b) a light-emitting element affixed to said rear surface of said single transparent panel and adapted to generate and project light outwardly, away from said front surface;
  c) substantially transparent means for delivering power to said light-emitting element operatively connected thereto and disposed on at least one of said front and said rear surfaces of said single transparent panel; and
  d) means, operatively connected to said light-emitting element for the control thereof and operatively connected to said means for delivering power, said controlling means being adapted and disposed to selectively control energization of said light-emitting element;

whereby at least when said light-emitting element is in an unenergized state, visibility through said signaling apparatus is substantially unoccluded.

2. The see-through signaling apparatus as recited in claim 1, wherein said light-emitting element comprises at least one from the group: LED, organic LED (OLED), electroluminescent device, incandescent bulb, halogen bulb, and fluorescent device.

3. The see-through signaling apparatus as recited in claim 2, further comprising:
   e) an electrochromic device disposed on said single substantially transparent panel.

4. The see-through signaling apparatus as recited in claim 2, further comprising:
   e) means for mounting said see-through apparatus to an environmental object.

5. The see-through signaling apparatus as recited in 4, wherein said means for mounting said see-through apparatus to an environmental object comprises at least one of the group: double backed adhesive device, a fixed bracket, and a hinged support.

6. The see-through signaling apparatus as recited in claim 5, wherein said means for mounting said see-through apparatus to an environmental object comprises a hinged support comprising a hinge and an electro-mechanical actuator operatively attached thereto and adapted to move said see-through display apparatus along an arcuate path around said hinge.

7. The see-through signaling apparatus as recited in claim 2, wherein said light-emitting element comprises a plurality of light emitting elements, further comprising:
   e) a controller operatively connected to and adapted to selectively energize each of said plurality of light-emitting elements, said controller comprising at least one input device from the group: a selector panel, a keyboard, and a receiver adapted to receive remotely generated control commands.

8. The see-through signaling apparatus as recited in claim 7, wherein said controller comprises means for selectively performing at least one of the functions: turning on and off, controlling the intensity of, generating a pattern by energizing a predetermined number, controlling the color, animating a pattern, displaying a textual message, scrolling a textual message, and blinking at a predetermined rate and duration at least one of said plurality of light-emitting elements.

9. The see-through signaling apparatus as recited in claim 8, further comprising:
   f) a remote control wirelessly connected to said receiver and configured and adapted to generate at least one command to cause said controller to perform at least one of said functions.

10. The see-through signaling apparatus as recited in claim 2, further comprising:
    e) a second, substantially transparent panel located behind, spaced-apart from, and substantially parallel to said single substantially transparent panel, the space between said rear surface of said single transparent panel and a front surface of said second transparent panel defining a plenum adapted for containing cooling air supplied thereto so as to cool said light-emitting elements.

11. The see-through signaling apparatus as recited in claim 10, further comprising:
    e) an electrochromic device disposed on at least one of said single and said second substantially transparent panels.

12. The see-through signaling apparatus as recited in claim 10, further comprising:
    e) means for mounting said see-through apparatus to an environmental object.

13. The see-through signaling apparatus as recited in claim 12, wherein said means for mounting said see-through apparatus to an environmental object comprises at least one of the group: double backed adhesive device, applied adhesive, a fixed bracket, and a hinged support.

14. The see-through signaling apparatus as recited in claim 13, wherein said hinged support comprises an electro-mechanical actuator operatively attached thereto and adapted to move said see-through display apparatus along an arcuate path around said hinge.

15. The see-through signaling apparatus as recited in claim 10, further comprising:
    e) a controller operatively connected to and adapted to selectively energize each of said light-emitting elements, said controller comprising at least of the input devices: a selector panel, a keyboard, and a receiver adapted to receive remotely generated control commands.

16. The see-through signaling apparatus as recited in claim 15, wherein said selectively energize step comprises at least one of the functions: turn on and off, control the intensity of, generate a pattern by energizing a predetermined number, control the color, animate a pattern, provide a textual message, scroll a textual message, and blink at a predetermined rate and duration at least one of said plurality of light-emitting elements.

17. The see-through signaling apparatus as recited in claim 16, further comprising:
    f) a remote control wirelessly connected to said receiver and configured and adapted to generate at least one command to cause said controller to perform said selective energization.

18. The see-through signaling apparatus as recited in claim 10, further comprising:
    f) an external plenum attached proximate a bottom edge of said see-through signaling apparatus and communicative with said plenum; and
    g) a discharge grill located proximate a top edge of said see-through signaling apparatus;
whereby air is introduced from said external plenum, said air being discharged by said discharge grill.

19. The see-through signaling apparatus as recited in claim 18, further comprising:
    h) an air moving device operatively connected to said external plenum.

20. The see-through signaling apparatus as recited in claim 19, further comprising:
    i) a temperature sensor disposed proximate said see-through signaling apparatus and operatively connected to said air moving device so as to control the speed thereof in response to a temperature of said see-through signaling device.

21. The see-through signaling apparatus as recited in claim 20, wherein said air moving device further comprises an intake disposed in one of the locations: inside a vehicle, and outside a vehicle.

* * * * *